(12) United States Patent
Park et al.

(10) Patent No.: US 9,520,727 B2
(45) Date of Patent: Dec. 13, 2016

(54) GRIPPER ASSEMBLY FOR BATTERY CHARGING AND DISCHARGING

(71) Applicant: LG CHEM, LTD., Seoul (KR)

(72) Inventors: Ji Won Park, Daejeon (KR); Myung Hoon Ko, Daejeon (KR); Seung Ho Na, Daejeon (KR); Chang Bum Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/467,735

(22) Filed: Aug. 25, 2014

(65) Prior Publication Data
US 2015/0061596 A1   Mar. 5, 2015

Related U.S. Application Data (63) Continuation of application No. PCT/KR2014/005016, filed on Jun. 5, 2014.

(30) Foreign Application Priority Data

Aug. 29, 2013 (KR) .................. 10-2013-0103160

(51) Int. Cl.
*H01M 2/26* (2006.01)
*H02J 7/00* (2006.01)
(Continued)

(52) U.S. Cl.
CPC ............. *H02J 7/0042* (2013.01); *H01R 4/26* (2013.01); *H01M 2/30* (2013.01)

(58) Field of Classification Search
CPC .................................................... H02J 7/0042
(Continued)

(56) References Cited

U.S. PATENT DOCUMENTS

2006/0270286 A1* 11/2006 Zhao ............... H01M 2/206
439/840
2011/0309837 A1   12/2011 Nishihara et al.
(Continued)

FOREIGN PATENT DOCUMENTS

CN        1734829 A      2/2006
EP        2 398 089 A2   12/2011
(Continued)

OTHER PUBLICATIONS

Extended European Search Report, dated Jul. 15, 2015, for European Application No. 14772265.6.

*Primary Examiner* — Richard Isla Rodas
*Assistant Examiner* — Johali Torres Ruiz
(74) *Attorney, Agent, or Firm* — Birch, Stewart, Kolasch & Birch, LLP (57) ABSTRACT

Provided is a gripper assembly for battery charging/discharging, which is electrically connected to a battery electrode to apply current during battery charging/discharging operation, the gripper assembly including a first electrode lead gripper including a first electrode gripper body disposed to correspond to a first electrode lead of the battery, and a first contact member coupled to one side of the first electrode gripper body and pressed to contact a surface of the first electrode lead and a second electrode lead gripper including a second electrode gripper body disposed to correspond to a second electrode lead of the battery, and a second contact member coupled to a side of the second electrode gripper body and attached to contact a surface of the second electrode lead.

7 Claims, 5 Drawing Sheets

(51) Int. Cl.
*H01R 4/26* (2006.01)
*H01M 2/30* (2006.01)

(58) Field of Classification Search
USPC .......................................... 320/113; 429/121
See application file for complete search history.

(56) References Cited

U.S. PATENT DOCUMENTS

| | | | | |
|---|---|---|---|---|
| 2012/0013340 A1* | 1/2012 | Yuasa | ................... | H01M 2/206 |
| | | | | 324/430 |
| 2012/0052370 A1* | 3/2012 | Moon | ..................... | H01M 2/06 |
| | | | | 429/179 |
| 2013/0164594 A1* | 6/2013 | Zahn | ..................... | H01M 2/021 |
| | | | | 429/120 |

FOREIGN PATENT DOCUMENTS

| | | |
|---|---|---|
| JP | 2000-58135 A | 2/2000 |
| JP | 2002-134176 A | 5/2002 |
| KR | 10-2006-0030986 A | 4/2006 |
| KR | 10-2011-0004004 A | 1/2011 |
| KR | 10-2011-0004005 A | 1/2011 |
| KR | 10-2011-0004006 A | 1/2011 |
| KR | 10-2011-0004007 A | 1/2011 |
| KR | 10-2012-0053152 A | 5/2012 |
| TW | 579614 B | 3/2004 |
| TW | M292198 U | 6/2006 |
| TW | M304777 U | 1/2007 |
| TW | M427680 U1 | 4/2012 |

\* cited by examiner

GRIPPER ASSEMBLY FOR BATTERY CHARGING AND DISCHARGING

CROSS-REFERENCE TO RELATED APPLICATIONS

This application is a Continuation of PCT International Application No. PCT/KR2014/005016, filed on Jun. 5, 2014, which claims priority under 35 U.S.C. 119(a) to Patent Application No. 10-2013-0103160, filed in the Republic of Korea on Aug. 29, 2013, all of which are hereby expressly incorporated by reference into the present application.

BACKGROUND OF THE INVENTION

Field of the Invention

The present invention relates to a gripper assembly for battery charging/discharging, and more particularly, to a gripper assembly for battery charging/discharging, which is pressed to contact a first battery electrode of a battery and is surface-attached to contact a second battery electrode lead.

Description of the Related Art

In general, batteries generate electric energy through chemical or physical reaction and these chemical batteries are classified into a primary battery and a secondary battery. That is, a battery such as a manganese battery, an alkaline battery and a mercury battery which are disposed once used is called as a primary battery, and a battery such as a rechargeable battery and a lead storage battery which may be recharged and used after complete consumption of electricity is called a secondary battery.

Recently, since portable electric devices such as mobile phones, PDAs, smart phones and laptop computers are widely used, there are increasing demands for technical development for a secondary battery which can be used for a long time on a single charge and has an extended life.

In consideration of charging/discharging efficiencies and current capacity, these secondary batteries are configured by a plurality cells therein, i.e., in the form of a battery cell in which unit cells are connected. Of secondary batteries, a lithium secondary battery is currently under limelight, because it has several advantages such as high energy density, light weight, high voltage, no pollution, high power, quick charge, and an extended life.

A manufacturing methods of secondary batteries includes a hard pack process in which battery cells are connected to circuits, terminals or connecting parts, and then assembled in a case, and a charging/discharging process for charging/discharging the hard packs.

The charging/discharging process is performed by using a gripper assembly for battery charging/discharging, wherein current and voltage grippers press the cathode and anode leads of a battery cell to perform charging/discharging operation, and the current and voltage grippers are gold-plated to enhance conductivity.

The gripper assembly for battery charging/discharging is described in detail IN Korean Patent Application Laid-Open No. 10-2011-0004004.

However, the gripper assembly for battery charging/discharging according to the related art has limitations that, since the whole length thereof is contracted as the volume of a battery cell is expanded during charging/discharging operation, cathode and anode leads pressed by the current and voltage grippers may be scratched while being transferred, and furthermore the current and voltage grippers are worn out due to friction between the cathode and anode leads and the current and voltage grippers to cause a damage on the gold-plated layer, resulting in a decrease in conductivity.

SUMMARY OF THE INVENTION

An aspect of the present invention provides a gripper assembly for battery charging/discharging, which prevents an electrode lead from being scratched and also prevents an electrode lead gripper from being worn out, even when the whole length of a battery is contracted during charging/discharging operation.

According to an aspect of the present invention, there is provided a gripper assembly for battery charging/discharging, in which an electrode lead gripper is developed such that it is pressed to contact one electrode lead of a battery and is attached to contact another electrode lead, thereby preventing the electrode lead from being scratched and also preventing the electrode lead gripper from being worn out to avoid damages on a gold-plated layer, even when a whole length of the battery cell is contracted as a volume of a battery cell is expanded during charging/discharging operation.

According to an embodiment of the present invention, a gripper assembly for battery charging/discharging, electrically connected to a battery electrode to apply current during battery charging/discharging operation, the gripper assembly includes a first electrode lead gripper including a first electrode gripper body disposed to correspond to a first electrode lead of the battery, and a first contact member coupled to one side of the first electrode gripper body and pressed to contact a surface of the first electrode lead and a second electrode lead gripper including a second electrode gripper body disposed to correspond to a second electrode lead of the battery, and a second contact member coupled to a side of the second electrode gripper body and attached to contact a surface of the second electrode lead.

The first contact member may be formed of metallic material.

The first contact member may be provided with a plurality of sharp jaws to press a surface of the first electrode lead.

The first contact member may be gold-plated.

The second contact member may be formed of conductive resin.

A bottom surface of the second contact member may be formed as a horizontal surface to be attached to a surface of the second electrode lead.

The first electrode may be a cathode and the second electrode may be an anode.

The first electrode lead and the second electrode lead are disposed on both sides of the battery.

The gripper assembly for battery charging/discharging further includes a supporting structure holding the battery, wherein first and second electrode lead grippers, which are brought into contact with first and second electrode leads respectively disposed at both sides of the battery, are provided on both end portions of the supporting structure, respectively.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

A gripper assembly for battery charging/discharging according to the present invention includes a first electrode lead gripper pressed to contact a first electrode lead of a battery, and a second electrode lead gripper attached to contact a second electrode lead. Thus, when a whole length of the battery is contracted due to expansion of the battery during battery charging/discharging operation, the second electrode lead moves while being attached to the second electrode lead gripper. Accordingly, it is possible to prevent the second electrode lead from being scratched and also prevent the first electrode lead gripper from being worn out.

Hereinafter, with reference to the accompanying drawings, embodiments of the present invention will be described in detail enough for those of ordinary skilled in the art to easily perform embodiments of the invention. The invention may, however, be embodied in many different forms and should not be construed as being limited to the embodiments set forth herein. In the following description of the present invention, a detailed description of known functions and configurations incorporated herein will be omitted to avoid making the subject matter of the present invention unclear and, in every possible case, like reference numerals are used for referring to the same or similar elements in the description and drawings.

Figure 1:
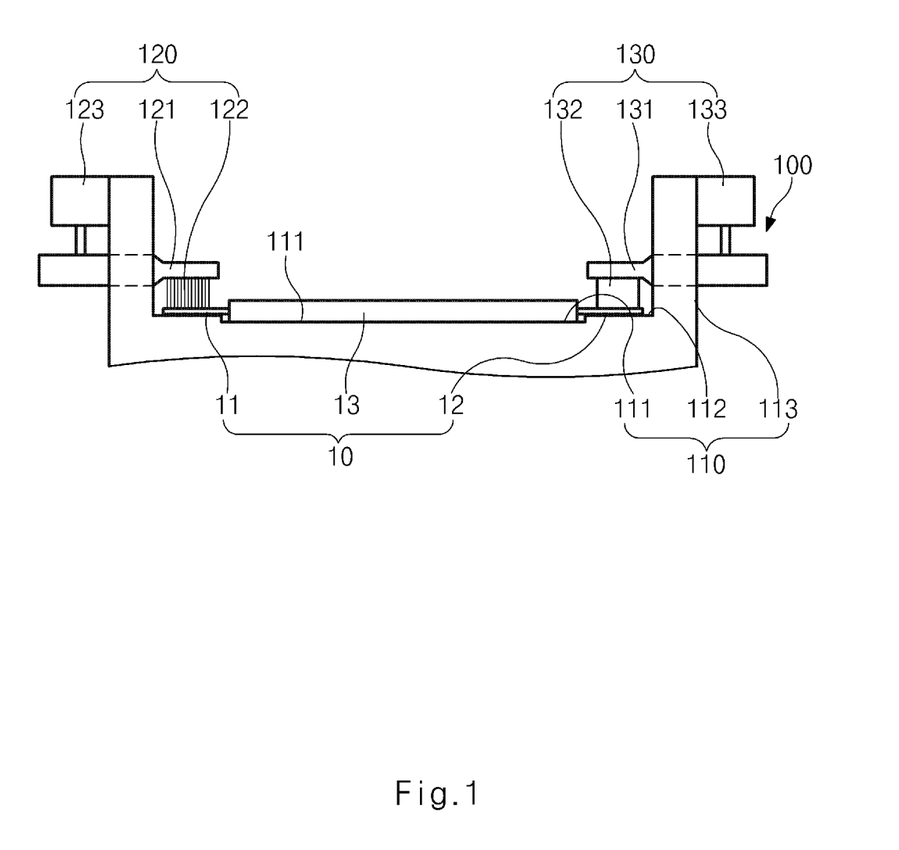
FIG. 1 is a view illustrating a gripper assembly for battery charging/discharging according to an embodiment of the present invention.

Referring to FIG. 1, a battery 10 uses a pouch type secondary battery and includes: an electrode assembly (not shown) consisting of a first electrode, a second electrode, and a separator interposed therebetween; first and second electrode leads 11 and 12 electrically connected to first and second electrode tabs protruding from the electrode assembly; and a pouch 13 holding the electrode assembly with the first and the second electrode 11 and 12 being exposed to the outside, wherein the first electrode is a cathode and the second electrode is an anode.

The first and the second electrode 11 and 12 herein are provided on both end portions of the electrode assembly, wherein the first electrode lead 11 is formed of aluminum to enhance conductivity and the second electrode 12 is formed of nickel or nickel-copper alloy. At this time, the first electrode lead and the second electrode lead 12 are connected to opposite-type electrodes, respectively. For example, the first electrode lead 11 is connected to an anode and the second electrode lead is connected to a cathode, and vice versa.

The battery 10 having the above-described configuration is charged/discharged through the gripper assembly 100 for battery charging/discharging according to an embodiment of the present invention.

The gripper assembly for battery charging/discharging 100 according to the present invention includes: a supporting structure 110 holding the battery 10; a first electrode lead gripper 120 provided at one side of the supporting structure 110 and pressed to contact the first electrode lead 11 of the battery 10 held by the supporting structure 110; and a second electrode lead gripper 130 provided at the other side of the supporting structure 110 and attached to contact the second electrode lead 12 of the battery 10 held by the supporting structure 110.

Figure 2:
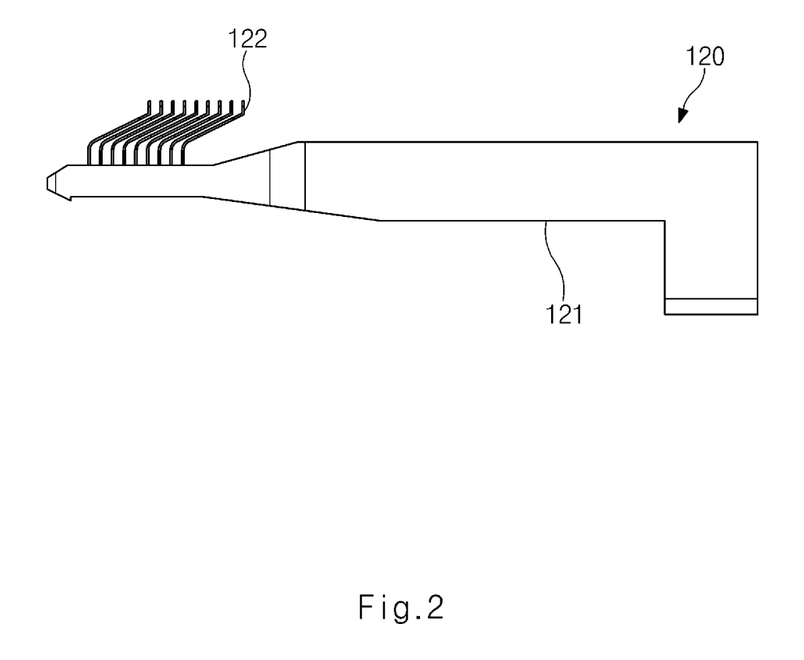
FIG. 2 is an enlarged view illustrating a first electrode lead gripper of a gripper assembly for battery charging/discharging according to an embodiment of the present invention.

Referring to FIGS. 1 and 2, the supporting structure 110 includes a bottom surface 111 which has a flat shape and on which a pouch 13 of the battery 10 is disposed at the center thereof, and a supporting surface 112 provided higher than the bottom surface and provided at both end portions of the bottom surface 111 to support the first and the second electrode lead 11 and 12 of the battery 10. Then, an installation surface 113 is provided on an end portion of the supporting surface 112 on which the first and second electrode lead grippers 120 and 130 are installed.

The supporting structure 110 may further include a jig device (not shown) to fix the battery 10 disposed at the bottom surface 111.

For instance, the jig device may include a jig provided at both side portions of the bottom surface 111 to support and fix both side surfaces of the battery 10, and a spring generating an elastic force to elastically support both the side portions of the battery 10.

Therefore, the jig device may stably fix the battery 10 disposed on the bottom surface 111 of the supporting structure 110, and thus enhance stability during charging/discharging operation.

As illustrated in FIG. 2, the first electrode lead gripper 120, which is pressed to contact the first electrode lead of the battery to supply voltage, includes: a first electrode gripper body 121 disposed to correspond to the first electrode lead 11 of the battery 10; a first contact member 122 coupled to a side of the first electrode gripper body 121 and pressed to contact a surface of the first electrode 11; and a first transferring member 123 transferring the first electrode gripper body 121 to allow the first contact member 122 to be pressed to contact the first electrode lead 11.

The first electrode gripper body 121 is installed on an installation surface 113 at one side of the supporting structure 110 to be able to slide towards the supporting surface 112 and a voltage cable (not shown) for electrical conduction is connected to the first electrode gripper body 121.

Figure 3:
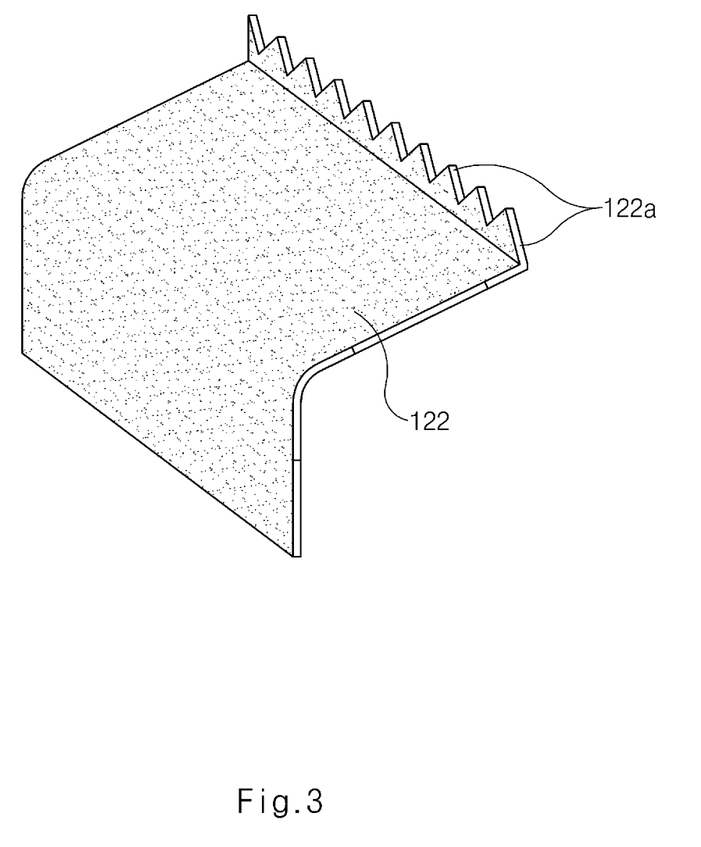
FIG. 3 is a perspective view a first contact member in FIG. 2.

As illustrated in FIG. 3, the first contact member 122 is formed of a metallic material and provided with a plurality of sharp jaws 122a to press the surface of the first electrode lead 11, thereby increasing the pressure on the first electrode lead 11 to enhance conductivity.

Figure 4:
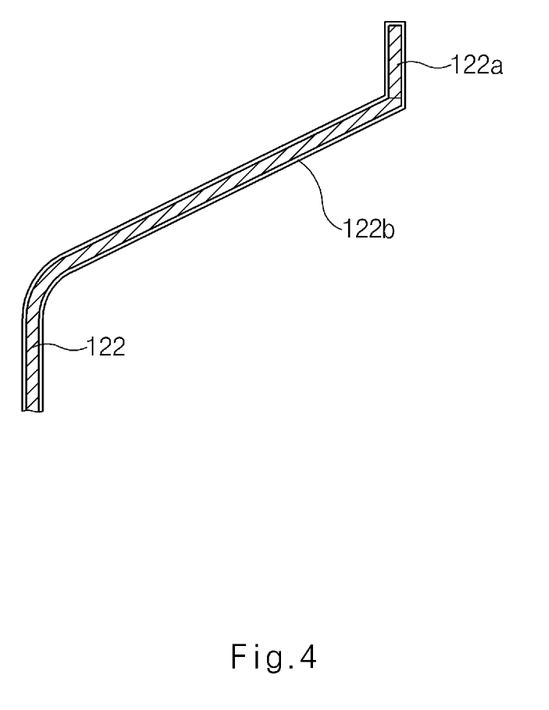
FIG. 4 is a perspective view a first contact member in FIG. 2.

The first contact member 122 may be gold-plated as illustrated in FIG. 4. Specifically, a gold-plated layer 122b is formed on an entire surface of the first contact member 112 to enhance conductivity.

The first transferring member 123 allows the first electrode gripper body 121 to descend in a direction of the supporting surface 112 or return to an original position.

For instance, the first transferring member 123 uses a hydraulic cylinder to allow the first electrode gripper body 121 to descend in a direction of the supporting surface 112 when the first electrode gripper body 121 is coupled to a piston rod to supply fluid pressure, and to return to the original position when the fluid pressure is released.

Figure 5:
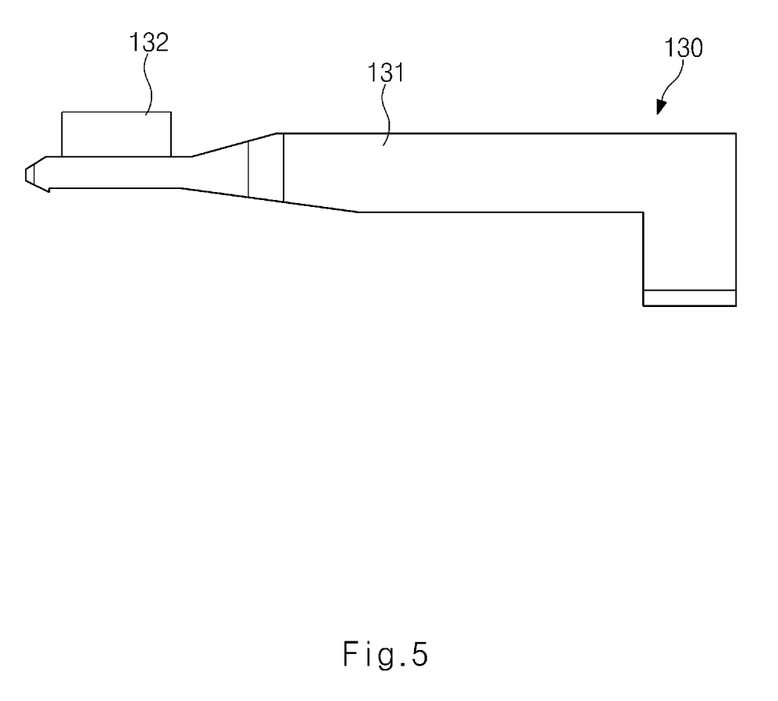
FIG. 5 is an enlarged view illustrating a second electrode lead gripper of a gripper assembly for battery charging/discharging according to an embodiment of the present invention.

As illustrated in FIG. 5, the second electrode lead gripper 130 attached to contact the second electrode lead of the battery includes: a second electrode gripper body 131 arranged to correspond to the second electrode lead 12 of the battery 10; a second contact member 132 coupled to a side of the second electrode gripper body 131 and attached to contact a surface of the second electrode 12; and a second transferring member 133 transferring the second electrode gripper body 131 to allow the second contact member 132 to be pressed against the first electrode lead 12.

The second electrode gripper body 131 is installed on the installation surface 113 at another side of the supporting structure 110 to be able to slide towards the supporting surface 112, and a current cable (not shown) for electrical conduction is connected to the second electrode gripper body 131.

The second contact member 132 is formed of a conductive resin to be attached to contact the surface of the second electrode lead 12, and thus always maintains a contact force between the second contact member 132 and the second electrode lead 12 even when the second electrode lead 12 is transferred by a predetermined interval due to a battery contraction in a whole length direction, and furthermore prevents the second electrode lead 12 from being scratched.

In other words, since the second contact member 132 is not pressed to contact but attached to contact the second electrode lead 12, a scratch is not formed on the second electrode lead 12.

A bottom surface of the second contact member 132 is formed as a horizontal surface 132a, so that the bottom surface is attached to contact the surface of the second electrode lead 12, thereby stably maintaining a contact force due to an increase in attached surface area, and noticeably preventing a mark such as a scratch on the surface of the second electrode lead 12.

The second transferring member 133 allows the first electrode gripper body 131 to descend in a direction of the supporting surface 112 or return to an original position.

For instance, the second transferring member 133 uses a hydraulic cylinder to allow the second electrode gripper body 131 to descend in a direction of the supporting surface 112 when the second electrode gripper body 131 is coupled to a piston rod to supply fluid pressure, and to return to the original position when the fluid pressure is released.

Hereinafter, the functions and effects of the battery charging/discharging gripper assembly forming above-described configuration will be described.

First, while the pouch 13 of the battery 10 is disposed on the bottom surface 111 of the supporting structure 110, the first and the second electrode leads 11 and 12 of the battery 10 are disposed on the supporting surface 112 provided on both end portions of the bottom surface 111. At this time, the battery 10 may be securely fixed through a jig device (not shown).

Next, the first electrode gripper 120 is pressed to contact the first electrode lead 11 and the second electrode lead gripper 130 is attached to contact the second electrode lead 12.

Specifically, the first contact member 122 of the first electrode gripper 120 is pressed to contact the first electrode lead 11 and the second contact member 132 of the second electrode lead gripper 130 is attached to contact the second electrode lead 12.

The volume of the battery 10 is expanded during charging/discharging and a whole length thereof is contracted.

Thus, the first and the second electrode leads 11 and 12 are moved in directions opposite to each other. Herein, the first electrode lead 11 and the first contact member 122 of the electrode lead gripper 120 are pressed and the second electrode lead 12 and the second contact member 132 of the second electrode lead gripper 130 are surface-attached, so that only the second electrode lead 12 which has a pressing force is transferred because.

The second contact member 132 of the second electrode lead gripper 130 is formed of a conductive resin to prevent the scratch when second electrode lead 12 is transferred, and furthermore the first electrode lead 11 is fixed to prevent the gold-plated layer from being damaged and the first contact member 122 of the first electrode lead gripper 120 from being worn out.

Consequently, the gripper assembly for battery charging/discharging according to an embodiment of the present invention may prevent scratches on the electrode lead from being and also prevent the gripper from being worn out and the gold-plated layer from being damaged by developing the gripper assembly such that the electrode lead grippers is attached to contact one of the electrode lead of the battery.

According to the present invention, the gripper assembly for battery charging/discharging is advantageous in preventing the first and the second electrode leads from being scratched and the electrode lead gripper from being worn out.

While the present invention has been shown and described in connection with the exemplary embodiments, it will be apparent to those skilled in the art that modifications and variations can be made without departing from the spirit and scope of the invention as defined by the appended claims.

What is claimed is:

1. A gripper assembly for battery charging/discharging, electrically connected to a battery electrode to apply current during battery charging/discharging operation, the gripper assembly comprising:
a first electrode lead gripper comprising a first electrode gripper body disposed to correspond to a first electrode lead of the battery, and a first contact member coupled to one side of the first electrode gripper body and pressed to contact a surface of the first electrode lead; and
a second electrode lead gripper comprising a second electrode gripper body disposed to correspond to a second electrode lead of the battery, and a second contact member coupled to a side of the second electrode gripper body and attached to contact a surface of the second electrode lead,
wherein the first contact member is formed of a metallic material, and the second contact member is formed of a conductive resin.

2. The gripper assembly of claim 1, wherein the first contact member is provided with a plurality of sharp jaws to press a surface of the first electrode lead.

3. The gripper assembly of claim 1, wherein the first contact member is gold-plated.

4. The gripper assembly of claim 1, wherein a bottom surface of the second contact member is formed as a horizontal surface to be attached to a surface of the second electrode lead.

5. The gripper assembly of claim 1, wherein the first electrode is a cathode and the second electrode is an anode.

6. The gripper assembly of claim 1, wherein the first electrode lead and the second electrode lead are disposed on both sides of the battery.

7. The gripper assembly of claim 6, further comprising:
a supporting structure holding the battery,
wherein first and second electrode lead grippers, which are brought into contact with first and second electrode leads respectively disposed at both sides of the battery, are provided on both end portions of the supporting structure, respectively.

* * * * *